(12) United States Patent
Commis et al.

(10) Patent No.: US 11,738,857 B2
(45) Date of Patent: Aug. 29, 2023

(54) WING TIP DEVICE

(71) Applicant: AIRBUS OPERATIONS LIMITED, Bristol (GB)

(72) Inventors: Ben Commis, Bristol (GB); Christopher Wright, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/871,892

(22) Filed: Jul. 22, 2022

(65) Prior Publication Data

US 2022/0363371 A1 Nov. 17, 2022

Related U.S. Application Data

(62) Division of application No. 16/574,461, filed on Sep. 18, 2019, now abandoned.

(30) Foreign Application Priority Data

Sep. 20, 2018 (GB) ...................................... 1815357

(51) Int. Cl.
*B64C 23/06* (2006.01)
*B64C 7/00* (2006.01)

(52) U.S. Cl.
CPC .............. *B64C 23/069* (2017.05); *B64C 7/00* (2013.01)

(58) Field of Classification Search
CPC ....... B64C 23/069; B64C 7/00; B64C 23/065; B64C 23/076; B64C 5/08; B64C 23/06
See application file for complete search history.

(56) References Cited

U.S. PATENT DOCUMENTS 4,722,499 A * 2/1988 Klug ..................... B64C 23/076
244/45 R
5,407,153 A 4/1995 Kirk et al.
(Continued)

FOREIGN PATENT DOCUMENTS

EP 2 792 595 10/2014
GB 2 551 708 1/2018
(Continued)

OTHER PUBLICATIONS

Combined Search and Examination Report for GB1815357.7, dated Mar. 18, 2019, 7 pages.
(Continued)

*Primary Examiner* — Brady W Frazier
*Assistant Examiner* — Shanna Danielle Glover
(74) *Attorney, Agent, or Firm* — Nixon & Vanderhye P.C.

(57) ABSTRACT

A wing tip device having a first wing tip device element for attaching at a first wing tip device element root to a tip of an aircraft wing, and a second wing tip device element extending from a second wing tip device element root to a second wing tip device element tip, the second wing tip device element root outboard, when viewed in the wing planform direction, of the first wing tip device element root; the first wing tip device element having a first wing tip device element leading edge and a first wing tip device element trailing edge, and the second wing tip device element having a second wing tip device element leading edge and a second wing tip device element trailing edge; and a fairing between the first and second wing tip device element which extends aft from the second wing tip device element trailing edge.

23 Claims, 8 Drawing Sheets

(56) References Cited

U.S. PATENT DOCUMENTS

| | | | |
|---|---|---|---|
| 2011/0204185 A1 | 8/2011 | Lyons | |
| 2011/0309202 A1* | 12/2011 | Smith | B64C 23/065 |
| | | | 244/198 |
| 2012/0312928 A1* | 12/2012 | Gratzer | B64C 23/065 |
| | | | 244/199.4 |
| 2015/0203190 A1* | 7/2015 | Witte | B64C 23/069 |
| | | | 244/199.4 |
| 2017/0015406 A1 | 1/2017 | Roman et al. | |
| 2017/0341737 A1 | 11/2017 | Paisley | |
| 2018/0009548 A1* | 1/2018 | Meisner | B64D 47/06 |

FOREIGN PATENT DOCUMENTS

| | | | |
|---|---|---|---|
| GB | 2 552 012 | 1/2018 | |
| GB | 3 266 717 | 1/2018 | |
| WO | 2012/007358 | 1/2012 | |
| WO | WO-2012007358 A1 * | 1/2012 | B64C 23/06 |

OTHER PUBLICATIONS

European Search Report cited in EP 19197603.4 dated Dec. 6, 2019, 10 pages.

* cited by examiner

WING TIP DEVICE

RELATED APPLICATION

This application is a divisional application to U.S. Ser. No. 16/574,461, filed Sep. 18, 2019, which claims priority to United Kingdom GB Application Number GB 1815357.7 filed Sep. 20, 2018, the entirety of which applications are incorporated by reference.

FIELD OF THE INVENTION

The present invention relates to a wing tip device, a wing including the wing tip device, an aircraft including the wing, and a method of attaching a wing tip device.

BACKGROUND OF THE INVENTION

Interference effects between two objects in an airflow can be created when the wetted surfaces of those objects are in close proximity. For example, interference effects exist between an aircraft's fuselage and its wings. These effects can be particularly pronounced on wing tip devices with multiple lifting surfaces, such as split winglets, due to both surfaces generating lift and the sharp intersection of a downlet having horseshoe vortex interference effects.

At the rearward junction of these lifting elements, adverse pressure gradients are present from the two lifting surfaces, the combination of which can cause excessive boundary layer growth and increased drag. If these effects could be minimised, the benefits would be appreciable.

SUMMARY OF THE INVENTION

According to an aspect of the invention, there is provided a wing tip device having a first wing tip device element for attaching at a first wing tip device element root to a tip of an aircraft wing, and a second wing tip device element extending from a second wing tip device element root to a second wing tip device element tip, the second wing tip device element root outboard, when viewed in the wing planform direction, of the first wing tip device element root; the first wing tip device element having a first wing tip device element leading edge and a first wing tip device element trailing edge, and the second wing tip device element having a second wing tip device element leading edge and a second wing tip device element trailing edge; and a fairing between the first and second wing tip device element which extends aft from the second wing tip device element trailing edge.

A wing tip device is a wing-like element that extends from the wing tip of an aircraft. A split winglet is a particular example that includes a wing-like lifting surface projecting upwardly (an 'uplet') from the wing, and a wing-like lifting surface projecting downwardly (a 'downlet') from the wing.

A fairing is an external structure added to smooth the outline between respective surfaces, increase aerodynamic streamlining, and reduce drag.

The wing planform direction is the direction normal to the plane of the wing.

By placing the fairing between the first and second wing tip device elements, the interference effects and vortical flow in the junction between the wing tip device elements can be reduced, thereby reducing drag, especially at high speed. Extending the fairing to project aft from the trailing edge of the second wing tip device element mitigates the adverse pressure gradients so that boundary layer growth and drag are both reduced.

According to a second aspect of the invention, there is provided an aircraft wing, comprising a root end and a tip end, and a wing tip device according to the first aspect attached to the tip end.

According to a third aspect of the invention, there is provided a fixed wing aircraft, comprising a wing according to the second aspect.

According to a further aspect of the invention, there is provided a method of assembling a wing tip device, the wing tip device including: a first wing tip device element with a first wing tip device element root end for attaching to an aircraft wing and a first wing tip device element trailing edge, a second wing tip device element having a second wing tip device element root end and a second wing tip device element trailing edge, and a fairing; the method comprising the steps of: attaching the second wing tip device element root end to the first wing tip device element outboard of the first wing tip device element root end, and attaching the fairing between the first and second wing tip device element which extends aft from the second wing tip device element trailing edge.

The second wing tip device element trailing edge may be forward of the first wing tip device element trailing edge The fairing may extend to the first wing tip device element trailing edge.

The fairing may extend aft of the first wing tip device element trailing edge.

The fairing may be separable from the first wing tip device element and/or the second wing tip device element. The fairing may be integrally formed with the first wing tip device element or second wing tip device element so that the respective wing tip device element can be built as a single molding.

The leading edge of second wing tip device element may be at or inboard of the leading edge of the first wing tip device element.

The fairing may extend forward of the second wing tip device element trailing edge. The presence of a horseshoe vortex in the junction adjacent the leading edge of the second wing tip device element can be exacerbated further aft. By providing a fairing adjacent to and forward of the leading edge of the second wing tip device element, these effects can be reduced and the associated increases in drag mitigated.

The wing tip device may have a vertex between the second wing tip device element and the first wing tip device element, when viewed in the aircraft longitudinal direction, the vertex having an angle of less than 120 degrees. The vertex angle may be less than 105 degrees or less than 90 degrees.

The aircraft longitudinal direction is the direction along an axis between the nose end and tail end of the aircraft fuselage.

The fairing may have a width extending across the first wing tip device element substantially in the thickness direction of the second wing tip device element, and wherein the width is least 15% of the root thickness of the second wing tip device element and/or no more than 100% of the root thickness of the second wing tip device element, such as a width that is at least 25% of the root thickness of the second wing tip device element.

The first wing tip device element has a wetted area, and the second wing tip device element has a wetted area, and wherein the wetted area of the second wing tip device element may be larger than the wetted area of the first wing tip device element. The wetted area of the second wing tip device element may be less than 20% of the wetted area of the first wing tip device element.

The wetted area of a device is the area of that device that is exposed to the external airflow.

The fairing may extend to the leading edge of the second wing tip device element along an upper aerodynamic surface of the second wing tip device element.

The fairing may extend towards the leading edge of the second wing tip device element along an upper aerodynamic surface and/or a lower aerodynamic surface of the second wing tip device element.

The fairing may extend around the leading edge of the second wing tip device between the upper and lower aerodynamic surface areas.

An avionic system or light may be attached to the fairing at a position aft of the first wing tip device element trailing edge. The avionic system may be attached at the cusp. The avionic system may be a sensor, an antenna, or any other suitable avionic device known in the art.

Avionic systems are electronic systems used on aircraft, for instance systems used for navigation and communication.

The first wing tip device element may be an upwardly extending wing tip device element. The second wing tip device element may be a downwardly extending wing tip device element. The first wing tip device element may be a downwardly extending wing tip device element. The second wing tip device element may be an upwardly extending wing tip device element.

The fairing may form an angle of less than 40 degrees to the first and/or second wing tip device element at an intersection of the fairing to the respective wing tip device element.

The fairing may have a concave outer surface, when viewed in the aircraft longitudinal direction, between the first wing tip device element and second wing tip device element.

The fairing may enclose a hollow volume.

One or more fasteners may be disposed between the fairing and the first wing tip device element or second wing tip device element.

BRIEF DESCRIPTION OF THE DRAWINGS

Embodiments of the invention will now be described with reference to the accompanying drawings, in which.

DETAILED DESCRIPTION OF EMBODIMENT(S)

Figures 1, 2:
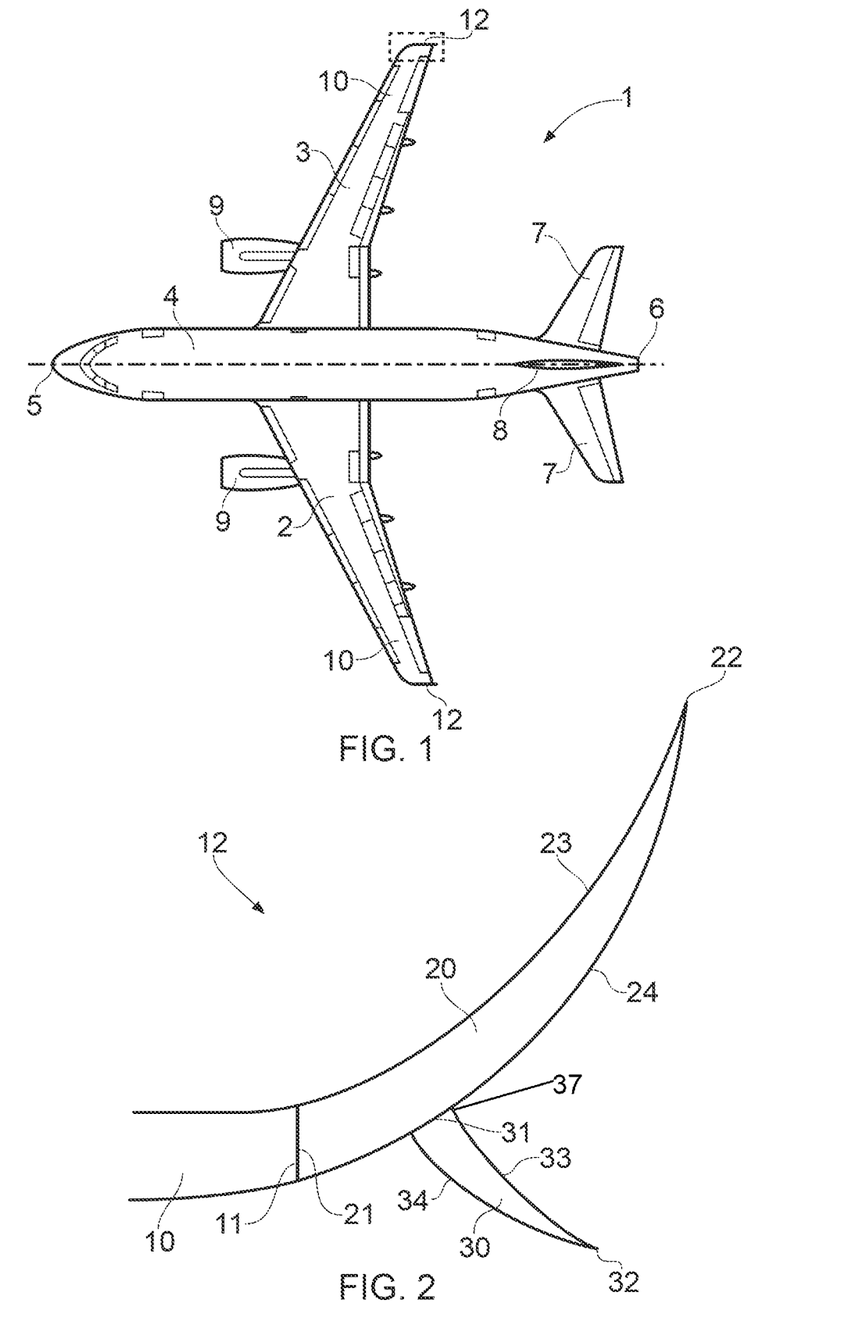
FIG. 1 is a plan view of an aircraft.
FIG. 2 shows a wing tip device viewed along the aircraft longitudinal axis.

FIG. 1 shows an existing aircraft 1 with port and starboard fixed wings 2, 3, engines 9, a fuselage 4 with a nose end 5 and a tail end 6, the tail end 6 including horizontal and vertical stabilising surfaces 7, 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 has a cantilevered structure with a length extending in a span-wise direction from a root to a tip, the root being joined to the aircraft fuselage 4. At the tip of each wing 2, 3 is a wing tip device 12 outboard of a main wing portion 10. The wings 2, 3 are aft swept and have a number of flight control surfaces.

As the wings 2, 3 are similar in construction, only the wing tip device 12 of the starboard wing 3 will be described in detail with reference to FIG. 2.

The wind tip device 12 includes a first wing tip device element 20 which is an upwardly extending wing tip device element, and a second wing tip device element 30 which is a downwardly extending wing tip device element. The first wing tip device element 20 includes an upper aerodynamic surface 23, a lower aerodynamic surface 24, a root end 21 which is attached to the outboard end 11 of the main wing portion 10, and a tip end 22 extending from the root end 21 in a generally spanwise direction, with reference to a plane of the wing, such that the first wing tip device element 20 increases the wingspan of the aircraft 1. The cant angle of the first wing tip device element 20 is increased in comparison to the wing 3 and continues to increase from the root end 21 of the first wing tip device element 20 to the tip end 22 of the first wing tip device element 20. Note that the term cant angle is defined as the angle between the wing tip device elements 20, 30 and a reference plane of the wing 3.

The second wing tip device element 30 has an upper aerodynamic surface 33, a lower aerodynamic surface 34, a root end 31 attached to the lower aerodynamic surface 24 of the first wing tip device element 20 outboard of the root end 21 of the first wing tip device element and inboard of the tip end 22 of the first wing tip device element. At a vertex 37 between the second wing tip device element 30 and the first wing tip device element 20, the second wing tip device element 30 extends at an angle of approximately 90° to the first wing tip device element 20. The tangential angle between the first wing tip device element 20 and the second wing tip device element 30 causes interference affects between the respective surfaces, for example between the lower aerodynamic surface 24 of the first wing tip device element 20 and the upper aerodynamic surface 33 of the second wing tip device element 30.

Figure 3:
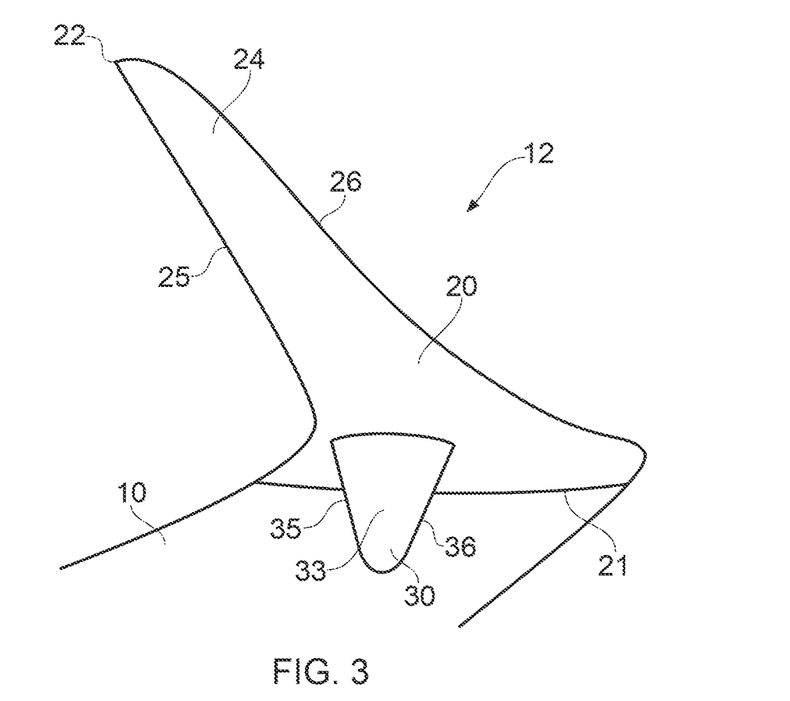
FIG. 3 shows a perspective view of the wing tip device.
Figure 4:
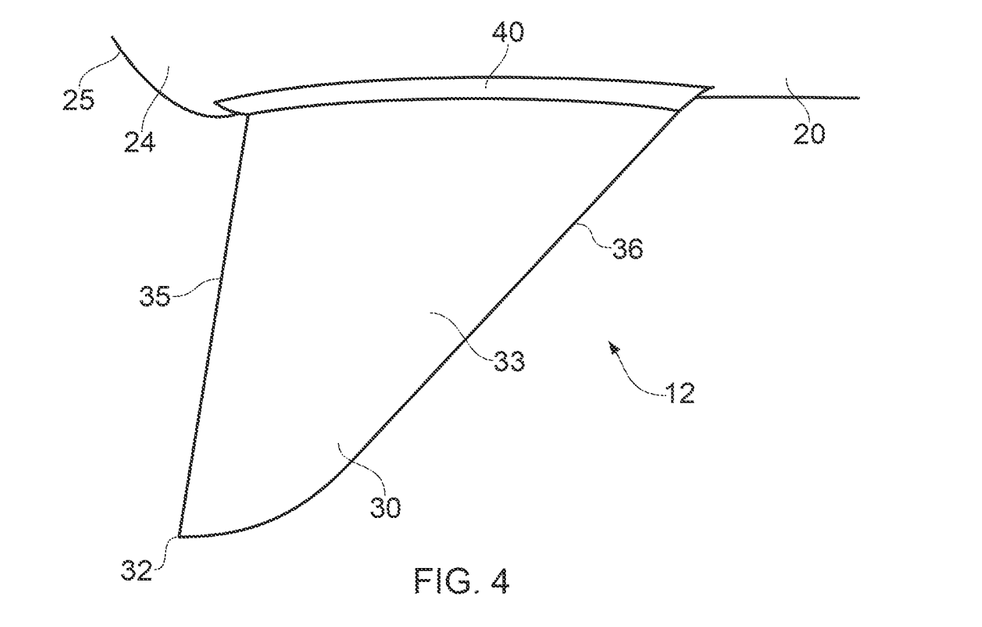
FIG. 4 shows the wing tip device including a fairing according to a first example.

As shown in FIG. 3, the second wing tip device element 30 is positioned on the lower aerodynamic surface 24 of the first wing tip device element 20 between the leading edge 26 and trailing edge 25 of the first wing tip device element 20, such that the leading edge of the second wing tip device element 30 is aft of the leading edge of 26 of the first wing tip device element and the trailing edge 35 of the second wing tip device element 30 is forward of the trailing edge 25 of the first wing tip device element 20. To reduce the drag across this junction, a fairing 40 is included that contours between the respective surfaces of the first wing tip device element 20 and the second wing tip device element 30. The fairing 40 encloses a hollow volume defined between the outer surface of the fairing, and the first and second wing tip device element 20, 30. The fairing 40 is attached to the first and second wing tip device elements 20, 30 by fasteners (not shown) within the hollow volume of the fairing 40 and hidden from the external airflow by the fairing. The fairing may alternatively be solid, or porous, and recesses made in the internal volume of the fairing 40 if fasteners project from the surfaces of the first and/or second wing tip device elements 20, 30. The fairing 40 wraps all the way around (i.e. entirely surrounds) the second wing tip device element 30 at the root end 31 to envelope the junction between the second wing tip device element 30 and the first wing tip device element 20.

Figure 5:
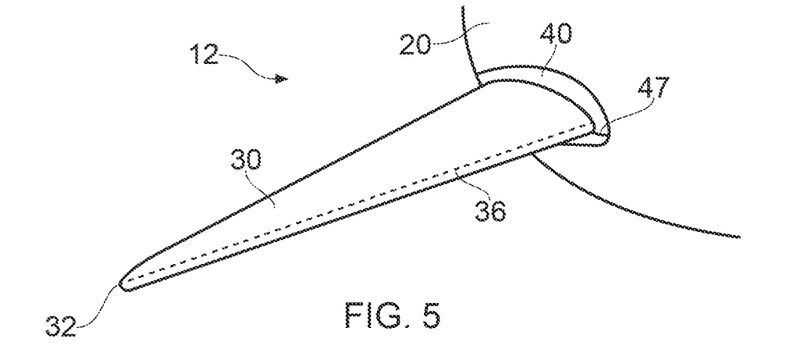
FIG. 5 shows a perspective view of the wing tip device including a fairing according to a first example.
Figures 6, 7:
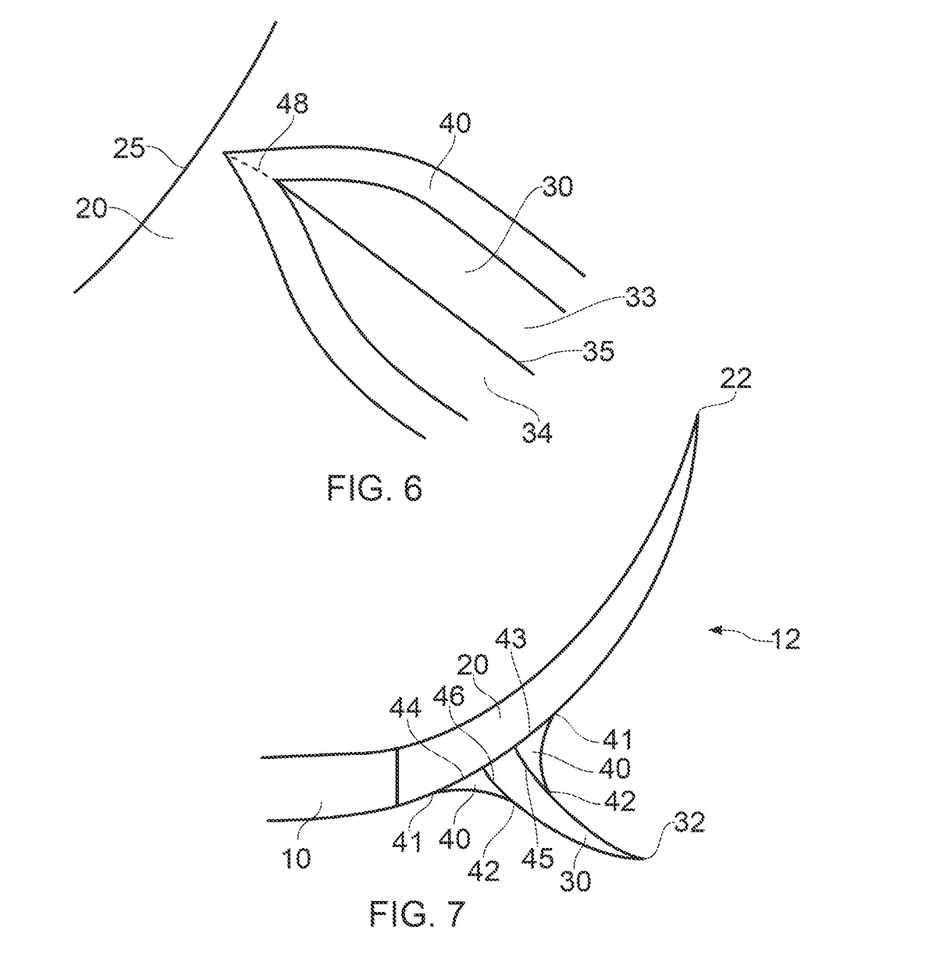
FIG. 6 shows a close-up view of the trailing edges of the first and second wing tip device elements of the wing tip device.
FIG. 7 shows the wing tip device including the fairing viewed along the aircraft longitudinal axis.

As shown in figures in 5-7 the fairing 40 is contoured between the upper aerodynamic surface 33 of the second wing tip device element 30 and the lower aerodynamic surface 23 of the first wing tip device element 20, between the lower aerodynamic surface 34 of the second wing tip device element 30 and the lower aerodynamic surface 24 of the first wing tip device element 20, forward of the leading edge 36 of the second wing tip device element 30 towards the leading edge 26 of the first wing tip device element 20, and between the trailing edge 36 of the second wing tip device element 30 and the trailing edge 25 of the first wing tip device element 20. The outer surface of the fairing 40 is concave so as to create a smooth aerodynamic profile at the junction of the first wing tip device element 20 and second wing tip device element 30 to reduce interference effects.

As shown in FIG. 7, the fairing 40 forms a first angle 41 of approximately 15° at an intersection of the fairing to the outer surface of the first wing tip device element 20 and a second angle 42 of between approximately 7° and 30°, such as 15° at an intersection of the fairing to the outer surface of the second wing tip device element 30. The fairing 40 has a first upper width 43 extending in a direction substantially perpendicular to the chordwise direction of the first wing tip device element 20 extending across the thickness of the first wing tip device element 20 from the upper aerodynamic surface 33 of the second wing tip device element 30, a first lower width 44 extending in a direction substantially perpendicular to the chordwise direction of the first wing tip device element 20 from the lower aerodynamic surface 34 of the second wing tip device element 30, a second upper width 45 extending in a direction substantially perpendicular to the chordwise direction of the second wing tip device element 30 across the thickness of the upper aerodynamic surface 33 of the second wing tip device element 30, and a second lower width 46 extending in a direction substantially perpendicular to the chordwise direction of the second wing tip device element 30 across the lower aerodynamic surface 34 of the second wing tip device element 30. In this example the first upper width 43, the first lower width 44, the second upper width 45, and the second lower width 46 each have a dimension of up to approximately 50% of the maximum root thickness of the second wing tip device element 30, such as between 15% and 100% of the maximum root thickness.

The fairing 40 further has a leading edge width 47 extending from the leading edge 36 in a substantially chordwise direction of the second wing tip device element towards the leading edge 26 of the first wing tip device element 20, and a trailing edge width 48 aft of the trailing edge 35 extending in a substantially chordwise direction of the second wing tip device element 30 towards the trailing edge 25 of the first wing tip device element 20. In this example the leading edge width 47 and trailing edge width 48 are up to approximately 50% of the maximum root thickness of the second wing tip device element 30, such as between 15% and 100% of the maximum root thickness.

Figure 8A:
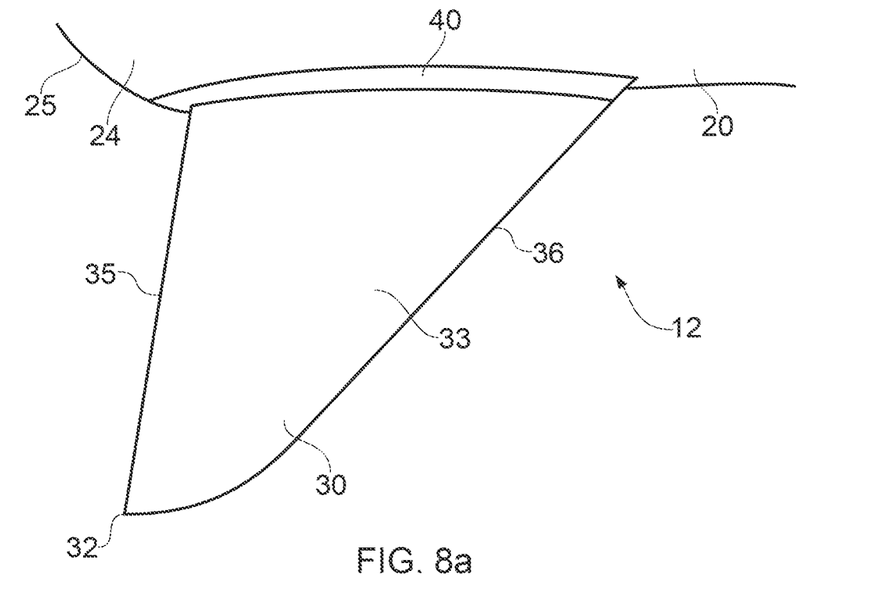
FIGS. 8a and 8b show a second example of the wing tip device including a fairing extending to the trailing edge of the first wing tip device element.
Figure 8B:
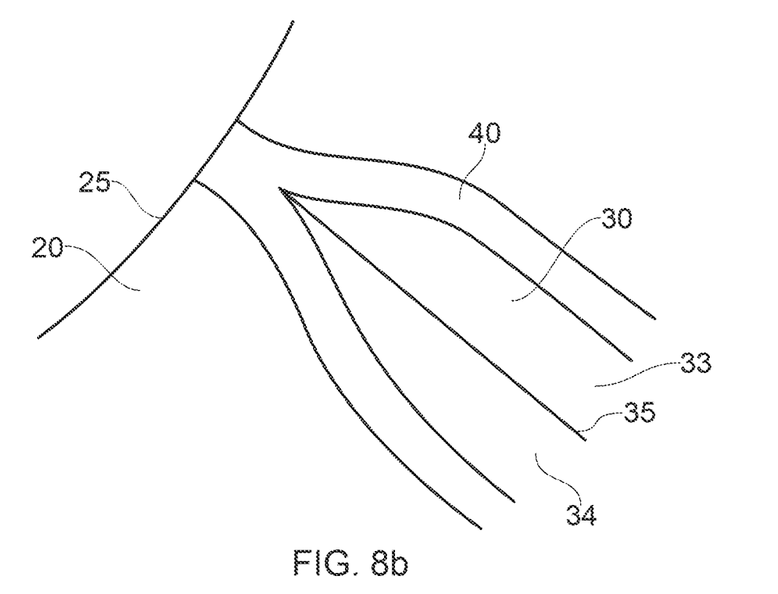

In a second example shown in FIGS. 8a and 8b, the fairing 40 extends from the trailing edge 35 of the second wing tip device element 30 up to and abutting the trailing edge 25 of the first wing tip device element 20. As in previous examples, the fairing 40 envelopes the junction between the second wing tip device element 30 and the first wing tip device element 20 to hide the junction from the airflow. The first upper width 43, first lower width 44, second upper width 45, second lower width 46, and leading edge width 47 of the fairing 40 are all substantially constant around the fairing 40, however the trailing edge width 48 extends to the trailing edge 25 of the first wing tip device element 20 (See FIG. 8b).

Figure 9:
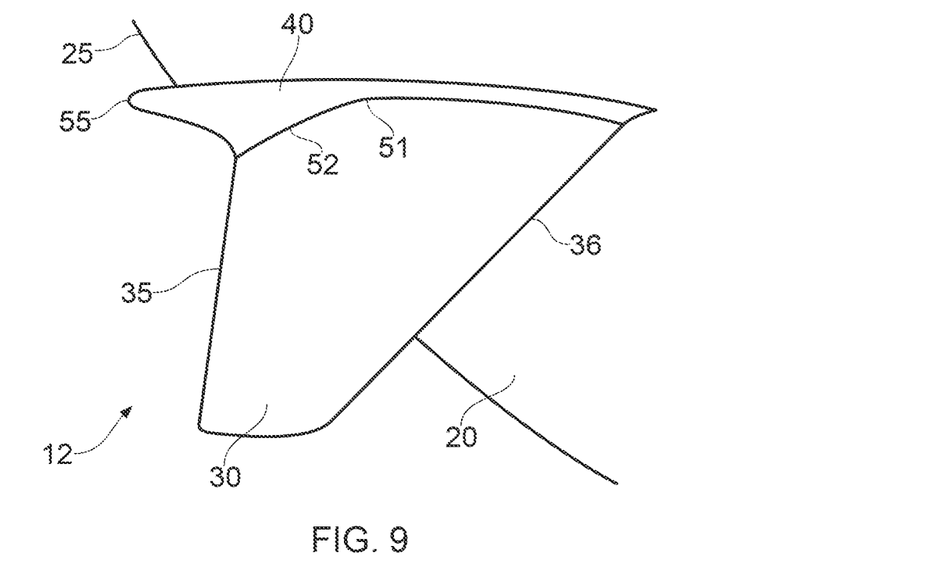
FIG. 9 shows a third example of the wing tip device including a fairing extending aft of the trailing edge of the first wing tip device element.

In a third example, shown in FIG. 9, the fairing 40 extends aft of the trailing edge 25 of the first wing tip device element 20. The first upper width 43, first lower width 44, second upper width 45, and second lower width 46 are all substantially constant from the leading edge 36 of the second wing tip device element 30 to a transition point 51 approximately 60% of the chord length of the second wing tip device element 30 aft of the leading edge 36 of the second wing tip device element 30. Rearward of the transition point 51 is a transition region 52 in which the second upper width 45 and second lower width 46 increase up to the trailing edge 35 of the second wing tip device element 30. The fairing 40 extends aft of the trailing edge 35 of the second wing tip device element 30 and the trailing edge 25 of the first wing tip device element 20 towards a cusp 55 of the fairing 40. The cusp 55 projects in the substantially chordwise direction of the second wing tip device element 30 from the second wing tip device element 30.

Figure 10:
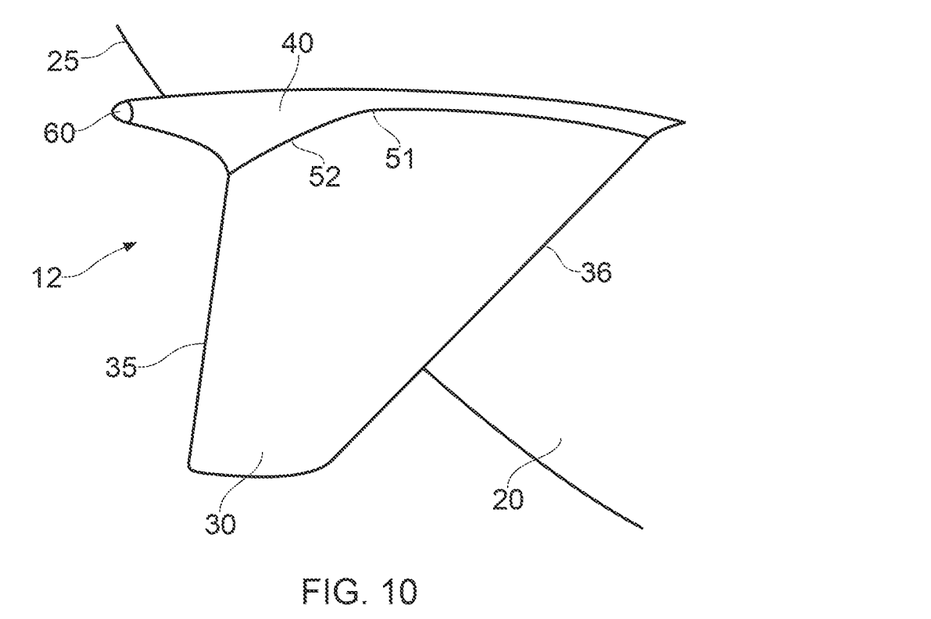
FIG. 10 shows a fourth example of the wing tip device including a fairing with an avionic system attached.

In a fourth example, shown in FIG. 10, the rearward extending fairing 40 provides an attachment position for avionic systems 60, such as a landing light or antenna.

Figure 11:
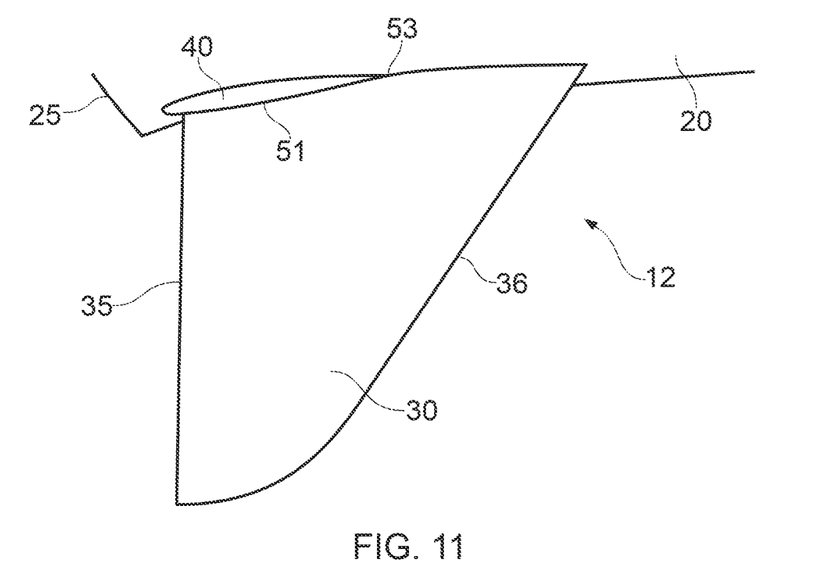
FIG. 11 shows a fourth example of the wing tip device including a fairing.

In a fifth example, shown in FIG. 11, the fairing 40 extends aft of the trailing edge 35 of the second wing tip device element 30 but does not extend forward of the leading edge 36 of the second wing tip device element 30. Instead the widths 43, 44, 45, 46 of the fairing 40 gradually decrease forward of a transition point 51 towards a termination point 53 positioned at a distance approximately 50% of the chord length of the second wing tip device element 30 from the trailing edge 35 of the second wing tip device element 30, such as between 5% and 100% of the chord length of the second wing tip device element 30 from the trailing edge 35 of the second wing tip device element 30. The fairing 40 therefore does not extend forward of the termination point 53, and the junction between the first wing tip device element 20 and second wing tip device element 30 forward of this termination point 53 is exposed to the airflow.

The interference effects from the adverse pressure gradients of the first wing tip device element 20 and second wing tip device element 30 begin towards the leading edge of the junction, and develop along the junction towards the trailing edge of the junction. It may therefore be the case that the interference effects are minimal forward of the certain point, and a fairing 40 is not required along the entire junction. Hence a localised fairing 40, i.e. a fairing that does not extend forward of a termination point 53, can be used to reduce the interference drag near the rear of the junction where the interference effects are most severe.

Figure 12:
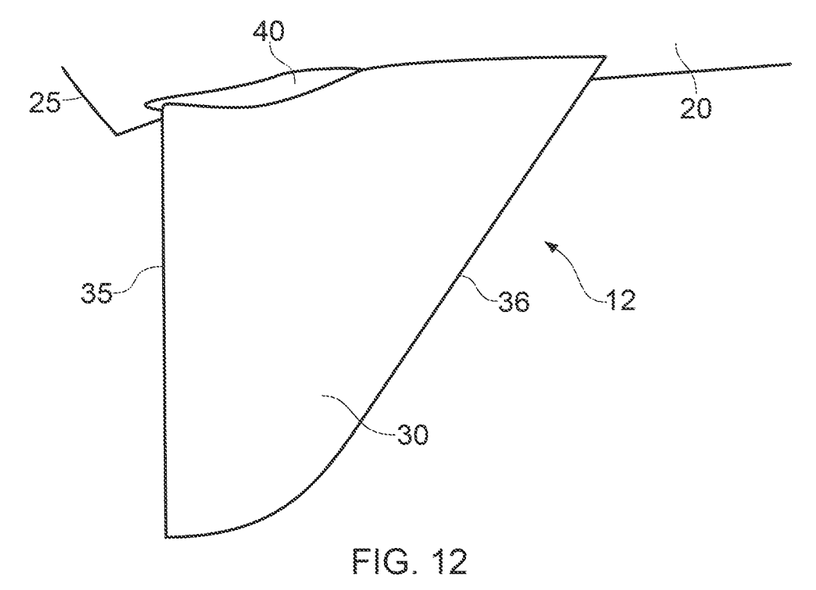
FIG. 12 shows a fifth example of the wing tip device including a fairing.

It will be clear to the skilled person that the examples described above may be adjusted in various ways. For instance, FIG. 12 shows an example in which the first upper width 43, first lower width 44, second upper width 45 and second lower width 46 each vary independently in size along the chord length between the trailing edge 35 and leading edge 36 of the second wing tip device element 30.

Figures 13, 14:
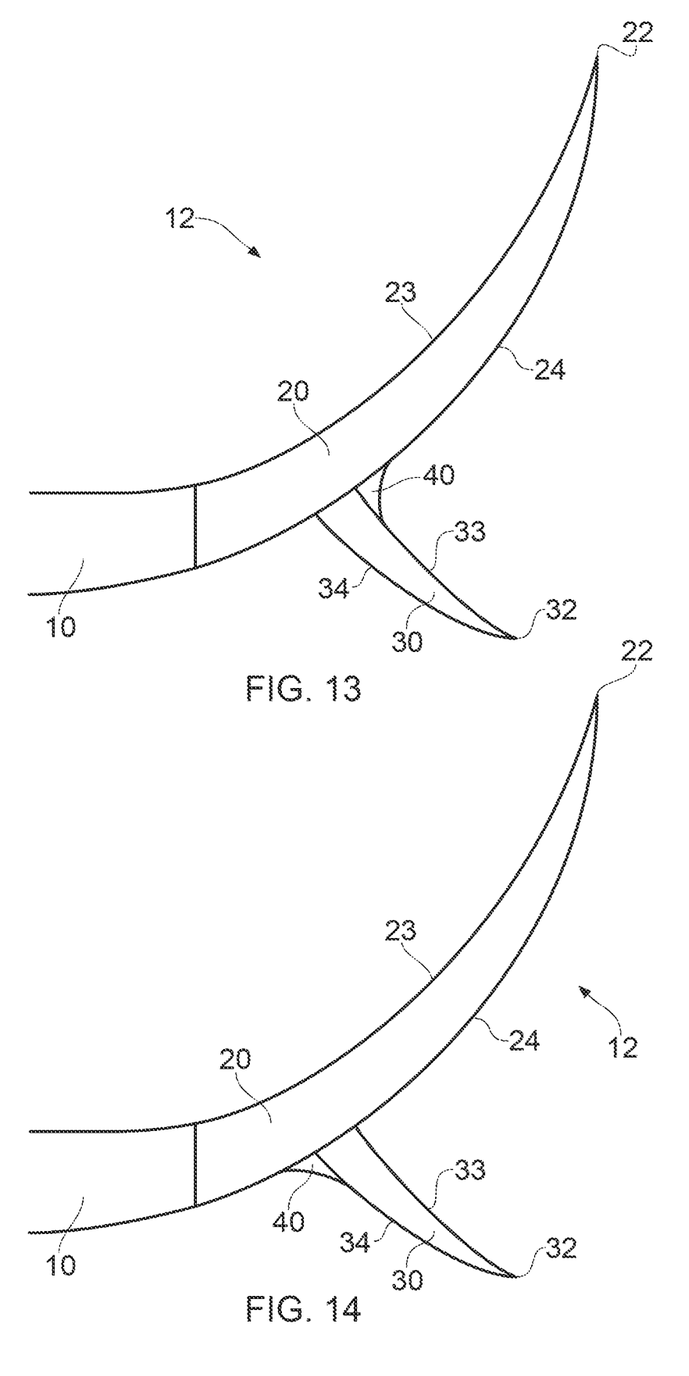
FIG. 13 shows a further example of the wing tip device including a fairing extending adjacent the upper surface of the second wing tip device element.
FIG. 14 shows further example of the wing tip device including a fairing extending adjacent the lower surface of the second wing tip device element.

The fairing 40 may extend adjacent the upper aerodynamic surface 33 and lower aerodynamic surface 34 of the second wing tip device element 30, as in previous examples, or may extend adjacent only one of the upper aerodynamic surface 33 and lower aerodynamic surface 34. For instance, in FIG. 13 an example is shown in cross-section in which the fairing 40 extends adjacent the upper aerodynamic surface 33 of the second wing tip device element 30 but not the lower aerodynamic surface 34. FIG. 14 shows an example in cross-section in which the fairing 40 extends adjacent the lower aerodynamic surface 34 of the second wing tip device element 30 but no the upper aerodynamic surface 33.

It will be clear to the skilled person that the invention is equally applicable to reduce interference effects between other types of split winglets.

Figure 15:
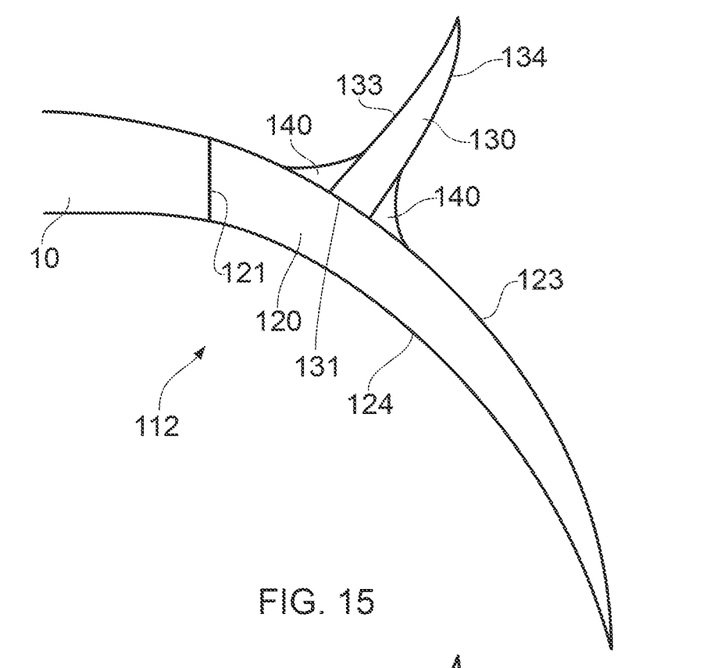
FIGS. 15 to 16 show further examples of the wing tip device in which the first wing tip device element is a downwardly extending wing tip device element and the second wing tip device element is an upwardly extending wing tip device element.
Figure 16:
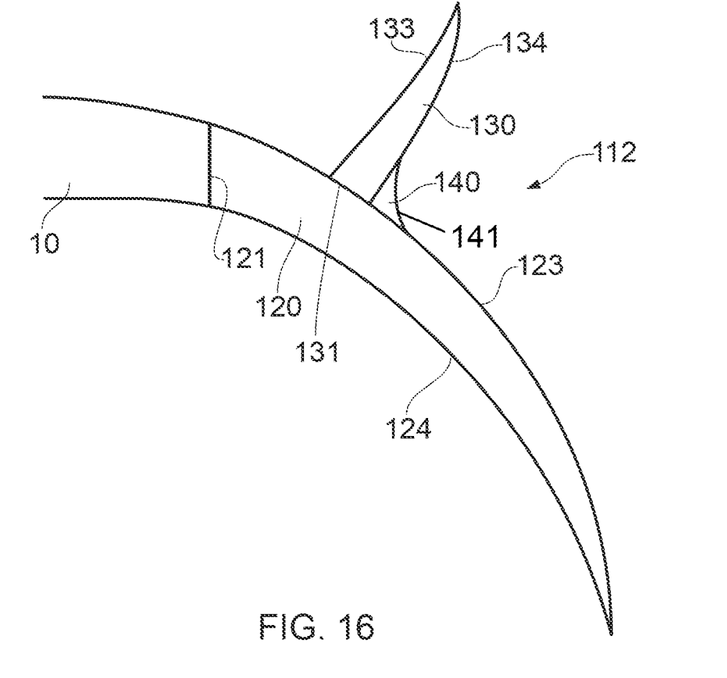

For instance, FIGS. 15 & 16 show examples of the wing tip device 12 in which similar reference numerals are used to denote similar parts but numbered in the 100 series. In the example of FIG. 15, the first wing tip device element 120 is a downwardly extending wing tip device element and the second wing tip device element 130 is an upwardly extending wing tip device element, such that the root end 131 of the second wing tip device element 130 attaches to the upper aerodynamic surface 123 of the first wing tip device element 120. The fairing 140 which includes an aerodynamic surface 141, extends along the upper aerodynamic surface 133 and lower aerodynamic surface 134 of the second wing tip device element 130, but may alternatively extend across only the lower aerodynamic surface 134, or may extend across only the lower aerodynamic surface as shown in FIG. 16.

It will be clear that many of the features described in relation to each example may be varied within the normal activity of the skilled person. For example, the first wing tip device element 20 and second wing tip device element 30 may be curved or straight. The first and second wing tip device elements 20,30 could both be upwardly extending, downwardly extending, or one of the wing tip device elements could extend in a spanwise direction in the plane of the wing (i.e. at a cant angle of 0).

The fairing 40 may wrap entirely around the junction between the first and second wing tip device elements 20, 30, or the fairing may only extend up to a termination point 53 between the trailing edge 35 and leading edge 36 of the second wing tip device element. The fairing may have a first termination point on the upper aerodynamic surface 33 of the second wing tip device element and a second termination point on the lower aerodynamic surface 34 of the second wing tip device element, and the first and second termination points may be at different positions along the chordwise direction of the second wing tip device element 30.

A rubber seal, or sealant, can be placed between the wing tip device elements 20, 30 and the fairing 40 in order to improve contouring between the respective elements.

The wing tip devices described in each of the above examples can be assembled by attaching the root end of the second wing tip device element to the first wing tip device element at a location outboard of the first wing tip device element root end, and attaching the fairing between the first and second wing tip device elements, wherein the fairing extends aft from the second wing tip device element trailing edge.

The fairing may be smoothly blended into the second wing tip device element to enable assembly of the fairing and second wing tip device element as a single moulding.

The wing tip devices may be fitted, or retro-fitted, to the outboard end of an aircraft having either no wing tip device (in the case of 'fitting') or as a replacement for an existing wing tip device (in the case of 'retro-fitting').

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A wing tip device comprising:
   a first wing tip device element for attaching at a first wing tip device element root to a tip of an aircraft wing;
   a second wing tip device element extending from a second wing tip device element root to a second wing tip device element tip, the second wing tip device element root is outboard, when viewed in a wing planform direction, of the first wing tip device element root, wherein the first wing tip device element includes a first wing tip device element leading edge and a first wing tip device element trailing edge, and the second wing tip device element includes a second wing tip device element leading edge and a second wing tip device element trailing edge; and
   wherein the second wing tip device element root is attached at a junction to the first wing tip device element outboard, when viewed in the wing planform direction, of the first wing tip device element root,
   wherein the second wing tip device element trailing edge at the junction is forward of a portion of the first wing tip device element trailing edge at the junction, and
   further comprising a fairing between the first and second wing tip device element extending aft from the second wing tip device element trailing edge at least to the portion of the first wing tip device element trailing edge.

2. The wing tip device according to claim 1, wherein the fairing extends aft of the first wing tip device element trailing edge.

3. The wing tip device according to claim 1, wherein the fairing is separable from the first wing tip device element and/or second wing tip device element.

4. The wing tip device according to claim 1, wherein the fairing is integrally formed with the second wing tip device element.

5. The wing tip device according to claim 1, including a vertex between the second wing tip device element and the first wing tip device element, when viewed in the aircraft longitudinal direction, the vertex having an angle of less than 120 degrees.

6. The wing tip device according to claim 1, wherein the fairing has a width extending across the first wing tip device element in a direction of a thickness of the second wing tip device element, and wherein the width is at least 15% of the root thickness of the second wing tip device element and/or no more than 100% of the root thickness of the second wing tip device element.

7. The wing tip device according to claim 1, wherein the first wing tip device element has a wetted area and the second wing tip device element has a wetted area, and wherein the wetted area of the second wing tip device element is larger than the wetted area of the first wing tip device element.

8. The wing tip device according to claim 7, wherein the wetted area of the second wing tip device element is less than 20% of the wetted area of the first wing tip device element.

9. The wing tip device according to claim 1, wherein the fairing extends towards the second wing tip device leading edge and along an upper aerodynamic surface and/or a lower aerodynamic surface of the second wing tip device element.

10. The wing tip device according to claim 9, wherein the fairing extends around the second wing tip device leading edge between the upper and lower aerodynamic surface areas of the second wing tip device element.

11. The wing tip device according to claim 4, wherein an avionic system or light is attached to the fairing at a position aft of the first wing tip device element trailing edge.

12. The wing tip device according to claim 1, wherein the first wing tip device element is an upwardly extending wing tip device element.

13. The wing tip device according to claim 1, wherein the second wing tip device element is a downwardly extending wing tip device element.

14. The wing tip device according to claim 1, wherein the fairing forms an angle of less than 40 degrees to the first and/or second wing tip device element at an intersection of the fairing to the respective wing tip device element.

15. The wing tip device according to claim 1, wherein the fairing has a concave outer surface, when viewed in the aircraft longitudinal direction, between the first wing tip device element and second wing tip device element.

16. The wing tip device according to claim 1, wherein the fairing encloses a hollow volume.

17. The wing tip device according to claim 1, wherein one or more fasteners are disposed between the fairing and the first wing tip device element or second wing tip device element.

18. An aircraft wing assembly comprising:
a fixed wing including a fixed wing root attached to a fuselage of an aircraft, a fixed wing tip at an end of the fixed wing opposite to the root;
a first wing tip device element including a first root, a first tip, a first leading edge, a first trailing edge and a first aerodynamic surface spanning the first leading edge and the first trailing edge, wherein the first root is attached to the fixed wing tip and wherein the first leading edge and the first trailing edge both span between the first root and the first tip;
a second wing tip device element including a second root, a second tip, a second leading edge, a second trailing edge and a second aerodynamic surface spanning the second leading and trailing edges, wherein the second root is attached to the first wing tip device and extends from the first aerodynamic surface at a position on the first aerodynamic surface outboard of the first root along a wing planform direction; and
a fairing covering a junction between the first and second wing tip devices wherein the fairing includes a fairing aerodynamic surface spanning the first and second aerodynamic surfaces,
wherein the second trailing edge at the junction is forward of a portion of the first trailing edge at the junction, and
wherein the fairing aerodynamic surface extends from at least the second leading edge to at least to the portion of the first trailing edge.

19. The aircraft of claim 18, wherein the fairing aerodynamic surface extends aft of the first trailing edge.

20. The method of assembling a wing tip device, the wing tip device including:
a first wing tip device element with a first wing tip device element root end for attaching to an aircraft wing and a first wing tip device element trailing edge, a second wing tip device element having a second wing tip device element root end and a second wing tip device element trailing edge, and a fairing,
wherein the second wing tip device element root end is attached to the first wing tip device element at a junction outboard of the first wing tip device element root end such that the second wing tip device trailing edge at the junction is forward of a portion of the first wing tip device element trailing edge at the junction;
the method comprising the steps of:
attaching the second wing tip device element root end to the first wing tip device element outboard of the first wing tip device element root end, and;
attaching the fairing between the first and second wing tip device elements which extends aft from the second wing tip device element trailing edge at least to the portion of the first wing tip device element trailing edge.

21. The wing tip device of claim 1, wherein the portion of the first wing tip device element is a forwardmost portion of the first wing tip device.

22. The aircraft wing assembly of claim 18, wherein the portion of the first wing tip device element is a forwardmost portion of the first wing tip device.

23. The method of claim 20, wherein the portion of the first wing tip device element is a forwardmost portion of the first wing tip device.

* * * * *